F. W. BECKWITH.
Whiffletree Hook.

No. 76,978.  Patented April 21, 1868.

Witnesses  Inventor
W. C. Aslekette  F. W. Beckwith
J. A. Service  per Munn & Co
  Attorneys

United States Patent Office.

FRANCIS W. BECKWITH, OF WESTMORELAND, NEW YORK, ASSIGNOR TO HIMSELF AND SMITH, CLARK & CO., OF SAME PLACE.

*Letters Patent No. 76,978, dated April 21, 1868.*

IMPROVEMENT IN WHIFFLE-TREE HOOK.

*The Schedule referred to in these Letters Patent and making part of the same.*

TO ALL WHOM IT MAY CONCERN:

Be it known that I, FRANCIS W. BECKWITH, of Westmoreland, in the county of Oneida, and State of New York, have invented new and useful Improvements in Whiffle-Tree Hooks; and I do hereby declare that the following is a full, clear, and exact description thereof, which will enable others skilled in the art to make and use the same, reference being had to the accompanying drawings, forming part of this specification.

Similar letters of reference indicate corresponding parts.

Figure 1:
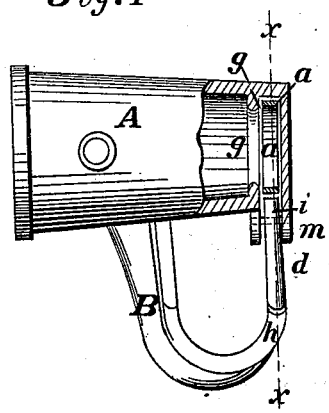
Figure 1 is a side view of my improved hook with a removed section showing the interior.
Figure 2:
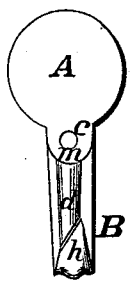
Figure 2 is an end view of the same.
Figure 3:
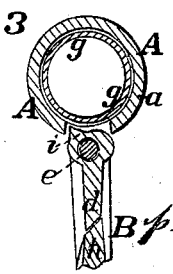
Figure 3 is a cross-section of the hook through the line $x$ $x$, fig. 1.

This invention consists of the combination of the thimble and spring-tongue for obtaining a more safe and convenient hook for whiffle-trees, as will be hereinafter more fully set forth.

In the accompanying plate of drawings, A is the thimble, for fitting on the end of a whiffle-tree, and B the hook part of the same.

The tongue, $d$, has its meeting-end bevelled to fit the corresponding beveiled part, $h$, of the hook B, which latter is cast on or otherwise firmly affixed to the thimble A, as shown. The tongue is pivoted between lugs, $m$, by a bolt or pivot, $e$, and is therefore permitted to be opened from the bevelled part $h$ of the hook B. The eye of the tongue bears a projection, $i$, which impinges on a circular spring, $a$, within the end of the thimble, and is held in place by the circular bead $g$, and the end of the thimble, as shown.

When the tongue is pressed so as to open the hook and admit the brace-hook or eye, the projection $i$ depresses that part of the circular spring, $a$, against which it impinges, and the projection, after having passed beyond a certain point on the said spring, (which is the point where the line through pivot centre of the tongue and the extreme end of the projection $i$ is normal to the curve of the spring,) the action of the spring is reversed, and it throws the tongue at or nearly at right angles to its first position.

When the trace is hooked in, and the tongue is pressed back to its place for holding the trace within the hook, the tongue closes against the hook with a smart snap, and is held in that position, whereby the trace cannot escape from the hook B. The action of the projection $i$ and the spring $a$ is somewhat analogous to the action of the angles or corners of a clasp-knife blade and its spring.

This invention is simple, durable, and not likely to get out of repair, and prevents the trace from escaping from the hook, which occurrence was, with the whiffle-tree hook as heretofore made, very frequent and annoying.

I claim as new, and desire to secure by Letters Patent—

The circular spring-band $a$, held against the end of the thimble by the bead $g$ and the tongue $h$, having the projection $i$ pivoted between the lugs $m$, all constructed, arranged, and operating as described, whereby the spring is compressed at each outward and inward movement of the tongue, and the latter held either open or closed by the outward expansion of said spring, as herein described, for the purpose specified.

The above specification of my invention signed by me, this 6th day of January, 1868.

FRANK W. BECKWITH.

Witnesses:
FRANCIS M. METCALF,
LEWIS H. SHATTUCK.